S. G. Cabell,
Fluting Machine.
No. 100,371. Patented Mar. 1, 1870.

Witnesses:
Phil. T. Dodge
Allen Dodge

Inventor:
S. G. Cabell
by Dodge & Munn
his Attys

UNITED STATES PATENT OFFICE.

S. G. CABELL, OF WASHINGTON, DISTRICT OF COLUMBIA.

IMPROVEMENT IN FLUTING-MACHINES.

Specification forming part of Letters Patent No. 100,371, dated March 1, 1870.

*To all whom it may concern:*

Be it known that I, S. G. CABELL, of Washington, in the county of Washington and District of Columbia, have invented certain Improvements in Fluting or Crimping Machines, of which the following is a specification, reference being had to the accompanying drawings.

My invention relates to fluting-machines; and the invention consists in a novel method of constructing and arranging the parts, more especially for adjusting the lower roll and securing it in place, as hereinafter explained.

Figure 1:
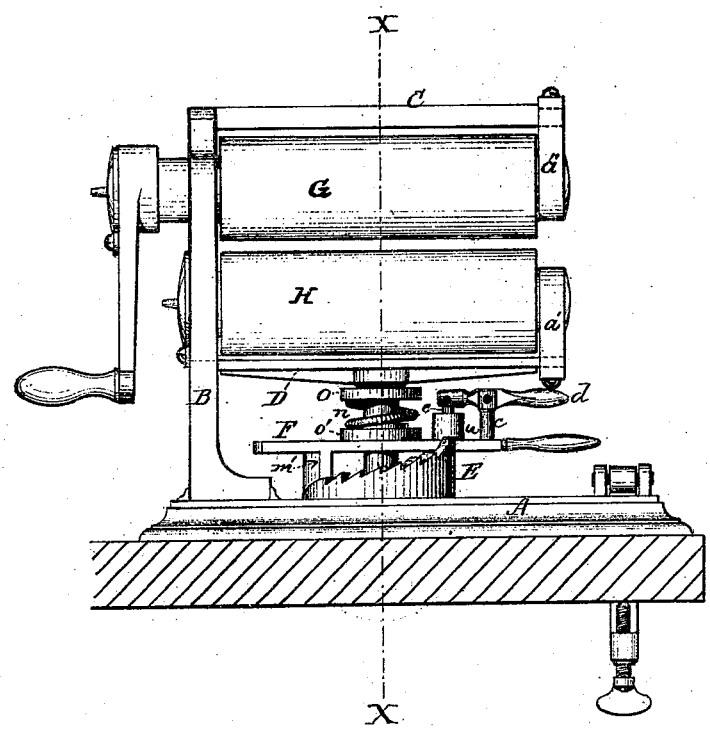
Figure 2:
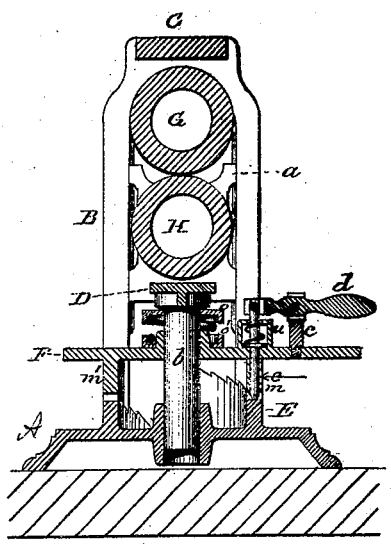
Figure 3:
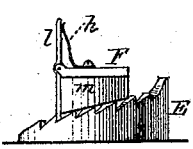

Figure 1 is a side elevation of a machine complete, and Fig. 2 is a transverse vertical section of the same on the line $x\ x$ of Fig. 1, Fig. 3 representing a modification of a portion detached.

In constructing this machine I form the frame of a bed-plate, A, with an upright, B, having an arm, C, projecting from its upper end parallel with the base, as shown in Fig. 1, the upright B being formed with a longitudinal opening or slot, as shown in Fig. 2, to receive a sliding head or box, $a$, in which one end of the lower roll has its bearing. This sliding box $a$ is secured to one end of a bar, D, which has a detachable bearing or box, $a'$, secured to its opposite end, as shown in Fig. 1, this bar D, with its boxes $a$ and $a'$, thus forming a rigid yoke, in which the lower roll, H, is mounted.

At the outer end of the rigid arm C, at the top, a similar detachable box, $a''$, is also secured, in which one end of the upper roll, G, has its bearing, the opposite end having its bearing in the upright B, and projecting through far enough to have a handle attached, as represented in Fig. 1.

Upon the upper side of the base A a circular boss, E, is formed, with double inclines on its upper edge, which edge is also serrated or notched, as shown in Figs. 1, 2, and 3. Across this boss E, I place a bar, F, having a handle formed on one end, and having projecting from its under surface lugs $m$, which are so arranged as to bear upon the upper edges of the boss, their lower surfaces being inclined, to correspond with the inclined surface or edge of the boss. A hole is made in the center of this bar F, through which and a corresponding hole in the base A at the center of the boss E extends a vertical stem or stud, $b$, which projects from the under side of the bar D, as shown in Figs. 1 and 2. A disk or collar, $o$, is placed on this stem $b$ close under the bar D, and another, also, $o'$, next above the bar F, and between these two collars $o$ and $o'$ a spiral spring, $n$, is placed around the stem $b$, this spring thus tending to force the lower roll, H, with its support upward, and thereby to press the lower roll against the upper one.

Upon the bar F is pivoted a lever, $d$, to the inner end of which is pivoted a vertical pin, $e$, which protrudes downward through a hole in the bar F, and through the lug $m$ below, its end thus engaging with the notches or serrations on the upper edge of the boss E, and serving as a catch to lock the bar F in position and prevent it from turning on the inclines of the boss E, on which it rests.

Upon the upper side of the bar F, at the point where the pin $e$ passes through it, a boss, $u$, is formed, inside of which is secured a spiral spring, that serves to hold the pin $e$ down in the notches. Instead of this, however, a flat spring may be placed under the outer end of the lever $d$ and made to serve the same purpose.

It is obvious that the collars $o$ and $o'$ may be cast on or formed with their respective bars D and F, instead of being made separate, if desired.

In Fig. 3 I have represented a modification of the locking device. In this case I pivot a small bar, $l$, to the side of the bar F, with its lower end projecting below the under surface of the lug $m$ far enough to engage in the notches in E, as shown, there being a spring, $h$, arranged to press against the upper end of the catch $l$ and keep it in an upright position, ready at all times to engage in the notches as the parts are moved.

In order to adjust the rolls and press them together it is only necessary to turn the bar F to the right, which causes it to ride up the inclines on the boss E, thereby elevating the lower roll and its support, and pressing it against the upper roll with more or less force, as may be desired.

To lower the roll it is only necessary to release the locking-pin $e$ and turn the bar F to the left.

It will be seen that I thus make a strong and simple machine, and one that can be adjusted with ease and rapidity.

Having thus described my invention, what I claim is—

1. The boss E, provided with the serrated inclines, in combination with the adjustable roll H and its support D, substantially as described.

2. The combination of the boss E, with its serrated inclines, with the bar F and its locking-pin $e$, or its equivalent, substantially as set forth.

3. The combination of the boss E, with its serrated inclines, the bar F, and the support D, with the spring $n$ interposed, substantially as herein described.

S. G. CABELL.

Witnesses:
 H. B. MUNN,
 PHIL. T. DODGE.